United States Patent
Noell et al.

[11] Patent Number: 5,966,482
[45] Date of Patent: Oct. 12, 1999

[54] OPTICAL NEAR-FIELD PROBE AND PROCESS FOR ITS MANUFACTURE

[75] Inventors: Wilfried Noell, Frankfurt; Alexander Ruf, Dresden; Karsten Mayr, Wiesbaden; Peter Güthner, Aarbergen, all of Germany

[73] Assignees: Institut für Mikrotechnik Mainz GmbH, Mainz; Omicron Vakuumphysik GmbH, Taunusstein, both of Germany

[21] Appl. No.: 08/890,738

[22] Filed: Jul. 11, 1997

[30] Foreign Application Priority Data

Jul. 12, 1996 [DE] Germany .......................... 196 28 141

[51] Int. Cl.[6] ................................................. G02B 6/26
[52] U.S. Cl. ................................................. 385/31; 385/12
[58] Field of Search ................................. 385/12, 31, 15; 250/227.14; 359/368

[56] References Cited

U.S. PATENT DOCUMENTS

| | | | |
|---|---|---|---|
| 5,105,305 | 4/1992 | Betzig et al. | 359/368 |
| 5,166,520 | 11/1992 | Prater et al. | |
| 5,294,790 | 3/1994 | Ohta et al. | |
| 5,410,151 | 4/1995 | Buckland | 250/227.26 |
| 5,485,536 | 1/1996 | Islm | 385/31 |
| 5,559,330 | 9/1996 | Murashita | 250/306 |
| 5,664,036 | 9/1997 | Islam | 385/31 |
| 5,812,723 | 9/1998 | Ohtsu et al. | 385/128 |

FOREIGN PATENT DOCUMENTS

0581217 A1  2/1994  European Pat. Off. .

*Primary Examiner*—Rodney Bovernick
*Assistant Examiner*—Ellen E. Kang
*Attorney, Agent, or Firm*—Panitch Schwarze Jacobs & Nadel, P.C.

[57] ABSTRACT

An optical near-field probe (1) includes a carrier component (10), which carries a tip (40), and has only one membrane (11, 20), transparent at least in the area of the tip (40), which is mounted on the light emission surface (9) of an optical waveguide (2) that is made of a rigid material such as glass or plastic. The dimensions of the membrane (11, 20), at least in one direction in the membrane plane, are less than or equal to the diameter of the optical waveguide (2). To position the tip (40) over the core (3) of the optical waveguide (2), optical methods can be used or the membrane and optical waveguide can be provided with locating elements.

14 Claims, 10 Drawing Sheets

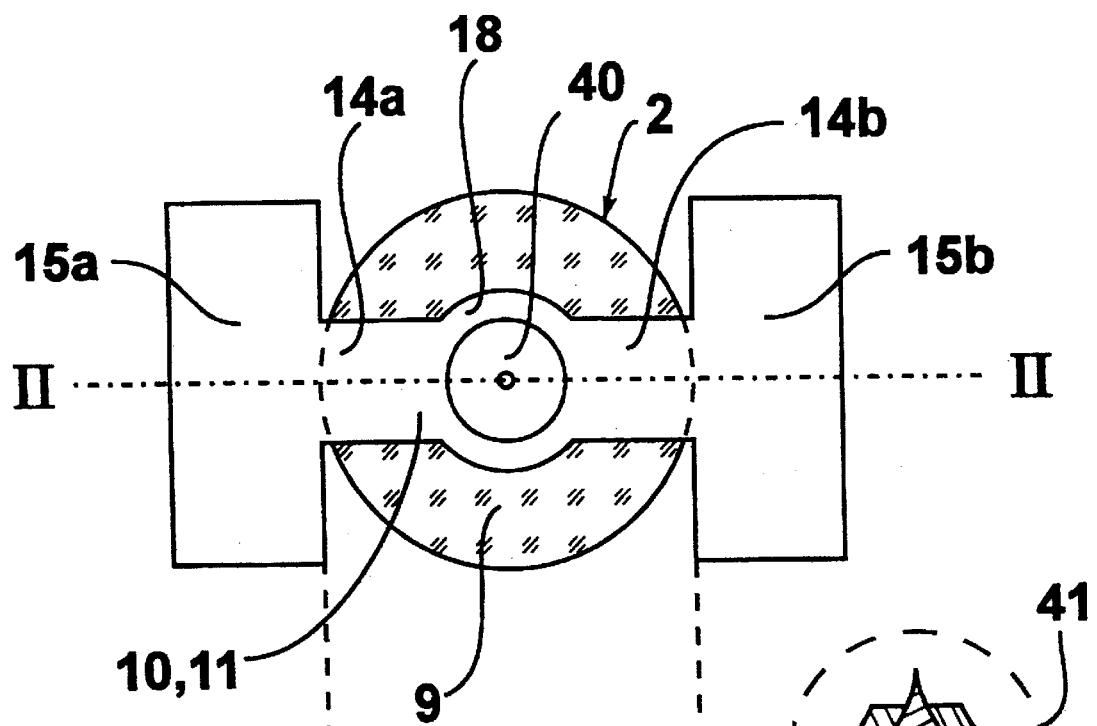
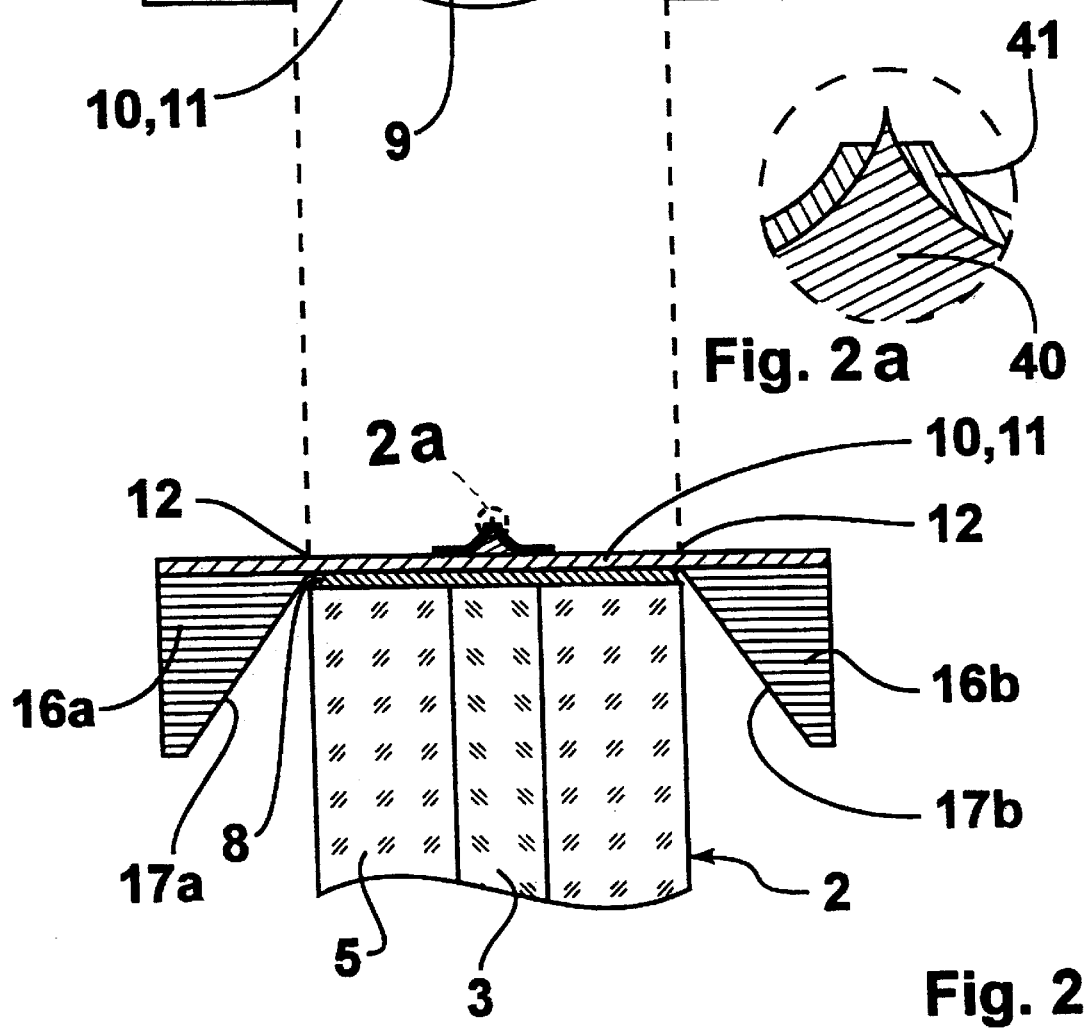
Fig. 1
Fig. 2a
Fig. 2

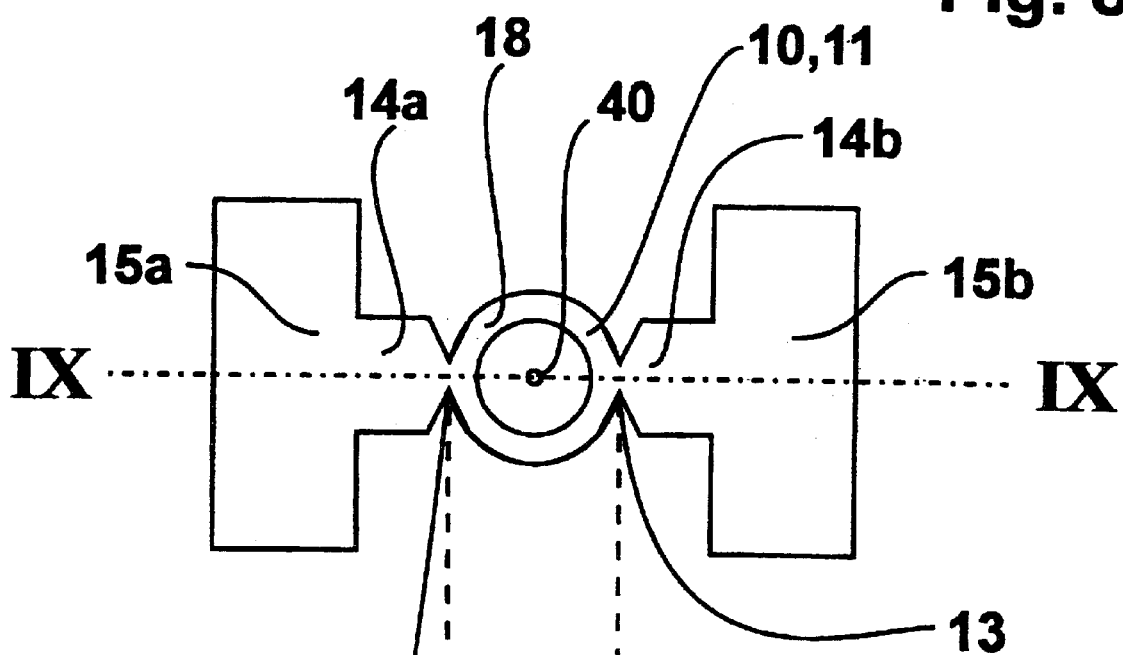
Fig. 8
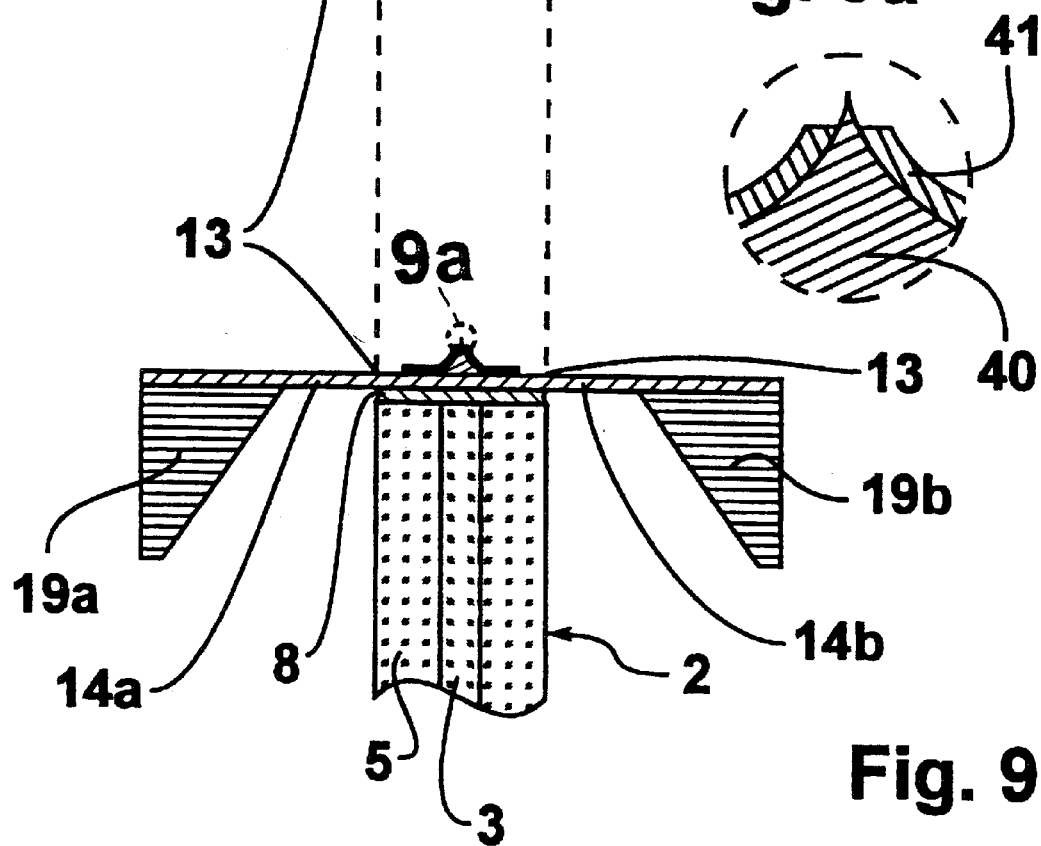
Fig. 9a
Fig. 9

OPTICAL NEAR-FIELD PROBE AND PROCESS FOR ITS MANUFACTURE

BACKGROUND OF THE INVENTION

The invention involves an optical near-field probe with an optical (light) waveguide and a tip manufactured by micro-engineering that is attached to a carrier component. The invention also includes a process for manufacture of an optical near-field probe.

Optical near-field probes are used in scanning near-field optical microscopy (SNOM), as is described for example in "Near-field Optics: Light for the World of NANO" in *J. Vac.Sci. Technol.*, B (12) 3, pages 1441–1446 (1994).

Optical near-field microscopy is based on the scanning of a surface using an optical aperture in order to reach resolutions better than the Abbé-limit. From *App. Optics*, vol. 34, no. 7, pages 1215–1228 it is known, for example, to use pointed glass fiber ends, which obtain a small aperture by vapor deposition of a metal layer. Optical signal detection alone has the disadvantage, however, that no separation of topographical and optical effects is possible. For the separation of these two effects it is necessary to adjust the glass fiber tip during scanning to a constant distance of several nanometers from the sample surface, which is possible only at a considerable adjustment expense in known near-field probes because of their method of construction. Furthermore, there is the risk without distance control that during scanning the glass fiber tip or the sample surface will become damaged.

In order to improve both of these aspects, shear force detection was developed, which is described in U.S. Pat. No. 5,254,854, for example. Shear force detection functions as a distance control, in order to adjust the distance between fiber tip and sample surface to a constant value. To do this, the glass fiber end is generally shifted by forced oscillations of a piezo ceramic element in constant oscillations parallel to the sample surface. The oscillation of the glass fiber end is damped in proximity to the sample surface, such that this damping becomes larger the closer the glass fiber tip is to the sample surface. In order to measure the damping of the oscillation, the glass fiber end is generally illuminated using a laser diode mounted orthogonally to the plane of oscillation, such that the changing shadow of the glass fiber modulates the intensity on a photodetector. This intensity modulation corresponds to the mechanical oscillation amplitude and functions electrically rectified as an input signal for a control circuit. Using a signal of the control circuit, another piezo ceramic element is controlled which shifts the distance of the sample surface to the glass fiber end to such an extent that an externally prescribed target value is obtained. In this way, the sample surface can be scanned by the tip, and the distance between tip and sample can always be followed or adjusted to a constant value.

For this it is necessary, among other things, that the near-field probe have a suitably large angular freedom on the one hand, i.e. that it can be brought to the sample without a large adjustment expense, and on the other hand, that it be constructed to be as thin as possible because the material thickness determines the damping and thus the resolution. Furthermore, it is desirable to construct the near-field probe in a way such that it can be manufactured as a mass-produced product.

It is known from U.S. Pat. No. 5,294,790 to manufacture the optical near-field probe from two components, namely glass fibers and tips. The disadvantage of the device described there consists in that the glass fiber is arranged at a distance to the membrane and thus to the near-field tip, so that an intermediate space is present which entails light losses that can only be avoided if the intermediate space is filled with a lens or an immersion liquid. Furthermore, the mounting of the near-field tip of this type is so voluminous that it cannot be used for shear force detection. In particular, it is not possible without a considerable adjustment expense to approach the tip to the sample surface, because a probe slope of only ±1°, relative to the normal line to the sample plane is allowed. With a larger probe slope edge areas of the probe would sit on the sample surface. Furthermore, the oscillation behavior for shear force detection is poor because of the large mass of the mounting structure on the fiber end, i.e., the probe has a small oscillation quality.

From U.S. Pat. No. 5,166,520 a near-field probe is known which is not, however, suitable for optical application purposes, but instead is used specially for conductivity measurements. To manufacture probes suitable for this, a glass pipette is taken as a start, on the end of which a membrane with a hollow tip is mounted. In the hollow tip an electrolyte is introduced for example, which is connected to a detection device via a suitable electric connection. This near-field probe is set directly onto the sample surface, so that the conductive material in the tip of the probe contacts the sample. In order to prevent damage, the membrane must be mounted in such a way that it is also flexible after being attached to the pipette and can be oscillated. For the membrane and the tip non-transparent materials are used. Near-field probes of this type cannot be used either for scanning near-field optical microscopy or for shear force detection, because on the one hand, the pipette is too rigid for this, and on the other hand, the membrane is fixed in its oscillation. Damage to the membrane is easily possible.

BRIEF SUMMARY OF THE INVENTION

An object of the invention is thus an optical near-field probe which has only a small mass and small light losses, has as large an angular freedom as possible, so that the adjustment expense is smaller when the near-field probe is used, and has an oscillation behavior which can be adjusted via the properties of the optical waveguide. It is also an object of the invention to make available a process for manufacturing such a near-field probe which is suitable for mass production.

This object is achieved by an optical near-field probe having an optical waveguide made of a rigid material and a micro-engineered tip attached to a carrier component mounted on a light emission surface of the optical waveguide. The carrier component has a single membrane, which is transparent at least in an area of the tip, and the dimensions of the membrane, at least in one direction in the plane of the membrane, are no greater than the diameter of the optical waveguide. The process for manufacturing the optical near-field probe includes the steps of providing an optical waveguide made of rigid material, providing a tip manufactured by micro-engineering on a membrane, positioning the membrane with the tip over a light emission surface of the optical waveguide, and attaching the membrane to the light emission surface. Advantageous embodiments are described hereinafter.

The carrier component has only one membrane, transparent at least in the area of the tip, which is mounted on the light emission surface of the optical waveguide. The membrane is thus preferably connected to the light emission surface of the optical waveguide without intermediate space and only by an adhesive layer, so that neither an immersion liquid nor a projection lens are necessary between the tip and the optical waveguide, in order to keep the light losses low.

By making the optical waveguide of rigid material, the membrane is affixed to the optical waveguide and can thus, without more, not be damaged. Preferably, the optical waveguide consists of a glass fiber or a polymer fiber.

The optical waveguide and membrane with tip can be manufactured separately, so that mass production is made possible. Moreover, on the whole, a compact, space-saving arrangement is created.

Contributing also to this compact design of the near-field probe is that the dimensions of the membrane, at least in one direction in the membrane plane, are less than or equal to the diameter of the optical waveguide. In this direction a large angular freedom is obtained, with the advantage that the adjustment expense of the near-field probe in the corresponding plane is clearly smaller. If the membrane is in total less than or equal to the diameter of the optical waveguide, a considerable reduction of the adjustment expense is obtained. The optical near-field probe can then also be brought to the sample without a large adjustment expense, even if it should be inclined by about ±10° from the normal line to the sample surface.

If the near-field probe should also be used for the shear force detection, then more total space is also available for the respective oscillation direction and the oscillation detection.

Furthermore, the membrane does not influence the oscillation behavior of the near-field probe because of its small mass, so that the oscillation properties are determined exclusively by the optical waveguide used. Other carrier components, which could disadvantageously affect the oscillation behavior or restrict the angular freedom of the near-field probe, are not provided. A near-field probe having a large oscillation quality and thus excellent topographical resolution is obtained.

The membrane consists preferably of at least one layer. This layer can have a transparent inner material arranged in the center, which is surrounded by an outer material, which can be transparent or non-transparent. The thickness of the layer is advantageously smaller than the core diameter of the optical waveguide.

It may be necessary under the circumstances, depending on the manufacturing process of the near-field probe, to manufacture the membrane from several layers of different materials, which must also all be transparent at least in the area of the tip, or to make the membrane thicker than the core diameter of the optical waveguide. In the last case, it is advantageous if the membrane layer has an inner and an outer material which is constructed, corresponding to the optical waveguide, from a core material and a sheathing material. In this process, the dimensions are selected corresponding to the dimensions of the optical waveguide, so that the light coming out of the core of the optical waveguide enters directly into the core area of the membrane layer, and thus no or only slight dispersion light losses can occur.

According to a further embodiment, the inner material of the membrane can be an integral component of the tip. According to a still further embodiment, the entire membrane can be an integral component of the tip, such that essentially a distinction must be made between two embodiments. According to one embodiment, tip and membrane are preferably manufactured in a micro-engineering manner in a combined manufacturing step. Membrane and tip are manufactured from the same transparent material in this case. The other embodiment provides for non-transparent membranes, preferably a metal membrane, which is formed at the center into a tip in which a hole is located. This metal tip can be hollow or filled with a transparent material.

To position the tip on the optical waveguide, optical processes can be applied. However, the possibility also exists to provide locating elements on the membrane and/or the optical waveguide. Especially for the manufacture of an integral component, the possibility presents itself for forming locating elements onto or into the side of the membrane facing away from the tip. These locating elements preferably comprise at least one recess and/or at least one projection. These recesses or projections can engage corresponding locating structures of the optical waveguide, which are provided on its light emitting surface. When the membrane and optical waveguide are joined together, the tip is thus positioned and adjusted in a simple way over the core of the optical waveguide.

Locating elements, which are either removed after attaching the membrane or which engage the outer perimeter of the optical waveguide and at least partially surround it, can also be provided only on the membrane.

According to a further embodiment, the recess in the membrane can extend up to the inside of the tip, whereby this recess can be constructed, for example, in a cone shape. For centering, a tip is also then provided, corresponding to the core of the optical waveguide, which engages in this recess.

In order to be able to replace the tip, for example a pressure adherent, material, which must also be transparent, is preferably used for the adhesive layer.

The process is thus characterized in that an optical waveguide made of a rigid material is used, that the tip is manufactured on a membrane or together with the membrane as an integral unit by micro-engineering, and that the membrane with the tip is positioned over the light emission surface of the optical waveguide and then attached the light emission surface. This positioning can occur by mechanical or optical means.

For the positioning of the unit comprising the tip and the membrane using optical means according to one embodiment, this unit is first positioned over the light emission surface, and light is beamed into the optical waveguide which comes out of the light emission surface of the optical waveguide. The light penetrating through the tip is captured by a suitable optical device. By targeted shifting of the membrane or the optical waveguide the intensity of the light passing through the tip changes. When the intensity maximum is reached, the tip is optimally positioned with regard to the core of the optical waveguide. Finally, both structural components are connected to each other.

Another possibility for positioning provides that an image processing system is arranged over the tip where preferably a membrane is used which has a diameter that is smaller than or the same size as the diameter of the optical waveguide. The membrane and the optical waveguide are shifted in relation to each other until the membrane or the tip is aligned coaxially to the light emitting surface of the optical waveguide. Finally, the membrane and the optical waveguide are connected to each other.

In order to make the handling of the membrane easier in this process, the membrane is provided with membrane strips which preferably project out over the edge of the light emitting surface of the optical waveguide, so that a suitably large area is available for grasping the membrane. In order to separate the membrane from the projecting components, tear away positions or break-off positions are provided. After the adhering, the transparent membrane rips under mechanical stress at these positions, so that the adhered membrane does not project beyond the diameter of the optical waveguide and thus can not impair the angular freedom when approaching the sample.

Instead of using an optical process for positioning, the possibility also exists for using mechanical means, i.e. locating elements, which are provided on the membrane and/or the optical waveguide. The locating elements mounted on the membrane can either stay on the membrane or be separated later, depending on their construction.

The optical waveguide can be etched on its light emitting surface in order to manufacture at least one projection and/or a recess. In the manufacture of the membrane a suitable recess and/or a suitable projection is formed therein or thereon. During the joining of membrane and optical waveguide these locating structures act together for positioning the tip. It is also possible to chamfer the outer edge of the sheathing of the optical waveguide, for example by polishing, and to provide corresponding slanted surfaces on the membrane.

As the optical waveguide a glass fiber or a polymer fiber is preferably used. Since the optical waveguide determines the mechanical damping behavior of the near-field probe, as thin an optical waveguide as possible is desirable. A glass fiber offers the advantage that the optical waveguide can be thinned out, for example by etching, only in the sheathing area, whereby the core area preferably maintains its diameter.

The membrane is preferably adhered to the optical waveguide. The adhesive can be omitted, if a material is used for the membrane which merely needs to be placed on the light emitting surface of the optical waveguide and is held there by adherent forces.

Customarily, the membranes are manufactured from silicon nitride. A polymer material can also be used for the membrane according to a further embodiment. If the polymer material has a lower softening point or melting point than the optical waveguide, then the optical waveguide can be heated to a temperature above the softening point of the polymer material, and then the membrane is placed on the surface of the optical waveguide. In this operation, the side of the polymer membrane facing away from the tip is softened or melted in a surface region, so that the membrane adheres to the light emitting surface of the optical waveguide. This process can be used particularly if glass fibers are involved for the optical waveguide.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 1 to 3 illustrate the manufacture of an optical near-field probe according to a first embodiment form of the invention;

FIGS. 8 to 10 illustrate the manufacture of a near-field probe according to a further embodiment of the invention.

DETAILED DESCRIPTION OF THE INVENTION

Figure 3:
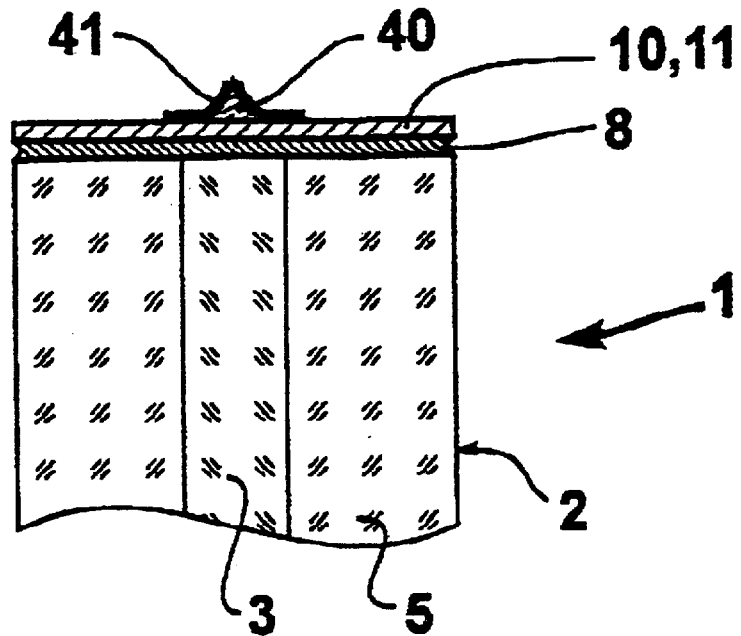

In FIG. 1, a plan view of the light emitting surface 9 of an optical waveguide 2 is depicted, over which a transparent membrane 11 is arranged as a carrier component 10, whose thickness is smaller than the core diameter of the glass fibers. The membrane 11, which carries the tip 40, has a circular shaped middle part 18 with a diameter which is smaller than the diameter of the optical waveguide 2. Membrane strips 14a and 14b extend laterally and transition into side parts 15a and 15b, which are advantageous for handling and are detached at the two tear away positions 12 after adhering the membrane 11.

As depicted in FIG. 2, which shows a section along the line II—II through the device shown in FIG. 1, the tip is provided with a metallic coating 41 which extends in the radial direction over the surface of the membrane 11, so that essentially the area of the core material 3 of the optical waveguide is covered. In this way, dispersion light from the optical waveguide 9 is prevented from exiting past the tip 40 out of the transparent membrane 11. The membrane 11 is connected at its middle part 18 and at its strips 14a and 14b via a transparent adhesive layer 8 to the S light emitting surface 9 of the optical waveguide 2. Below the side parts 15a and 15b cone-shaped locating elements 16a, 16b are attached. By the slanted surfaces 17a, 17b of the locating elements 16a, 16b, which extend up to the edge region of the sheath 5 of the optical waveguide, the optical waveguide 2 is centered in a simple manner when the membrane 11 and optical waveguide 2 are joined together.

After the adhering, the side parts 15a, 15b with the locating elements 16a, 16b are separated and the near-field probe 1 shown in FIG. 3 is obtained. The membrane 11 does not project outside in relation to the optical waveguide 2, so that the angular freedom of the near-field probe 1 is not impaired.

Figure 4:
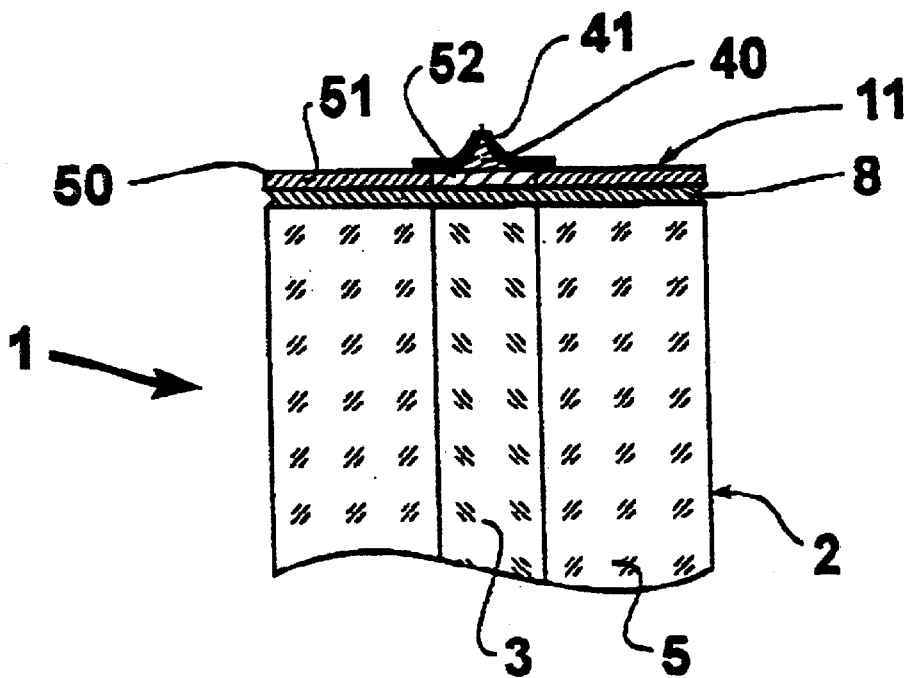
FIGS. 4, 5 and 6 show near-field probes according to further embodiments of the invention.
Figure 5:
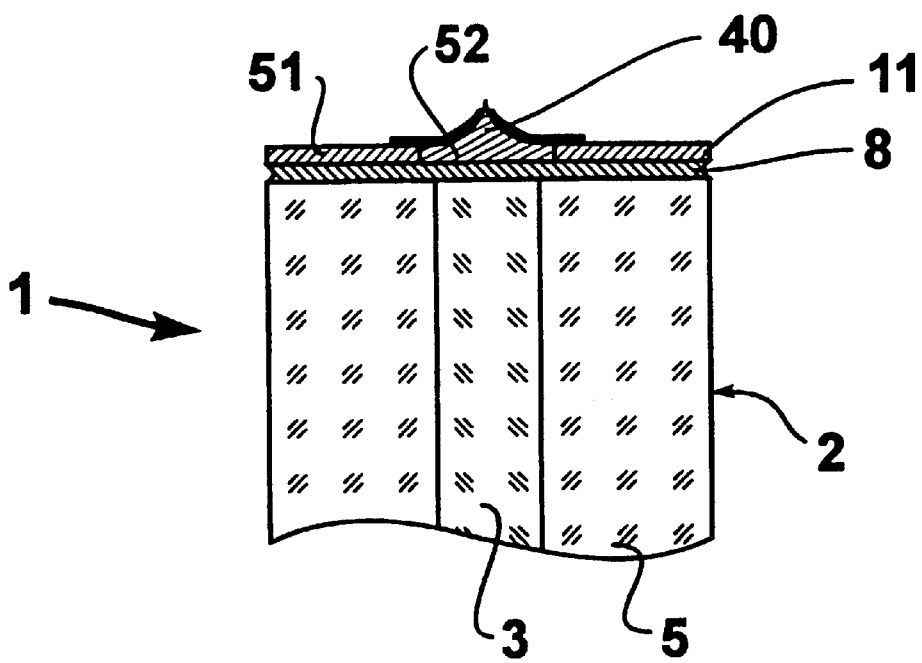
Figure 6A:
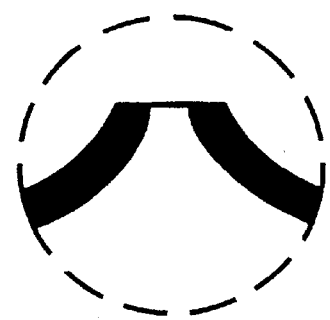
Figure 6:
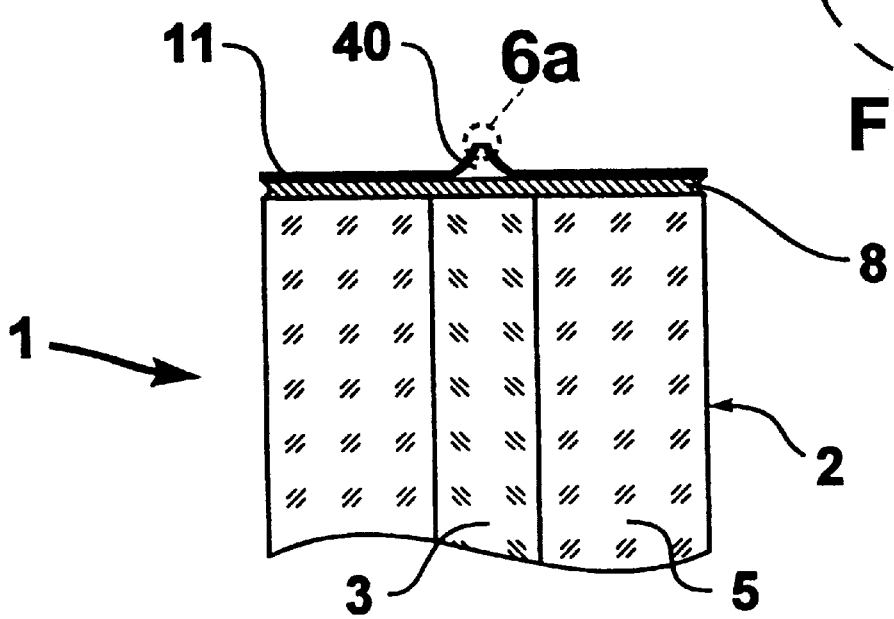

In FIGS. 4 to 6, further embodiments of the near-field probe 1 are depicted. According to FIG. 4, the membrane 11 consists of a layer 50, which has two materials. In the center of the layer 50, the transparent inner material 52 is located, which is surrounded by an outer material 51. In the embodiment shown here, the dimension of the inner material corresponds to the dimension of the core material 3 of the optical waveguide 2. The materials 51 and 52 can consist of a core and a sheathing material corresponding to the construction of the optical waveguide 2. A further possibility consists in that the material 52 is transparent and the outer material 51 is non-transparent.

In FIG. 5 an embodiment is depicted in which the core material 52 is an integral component of the tip 40. The tip 40 and core material 52 thus consist of the same material. The diameter of the inner material 52 is somewhat larger than the diameter of the core material 3 of the optical waveguide 2.

In FIG. 6, an embodiment is depicted in which the membrane 11 and tip 40 are constructed as an integral structural component. In this case, a material is involved which is not transparent for the wavelength used in the near-field probe. Preferably, a metal membrane 11 is used, into which a hole is made while simultaneously protuberating the membrane material. In this way, a tip 40 is formed which is either hollow or filled with a transparent material.

Figure 7:
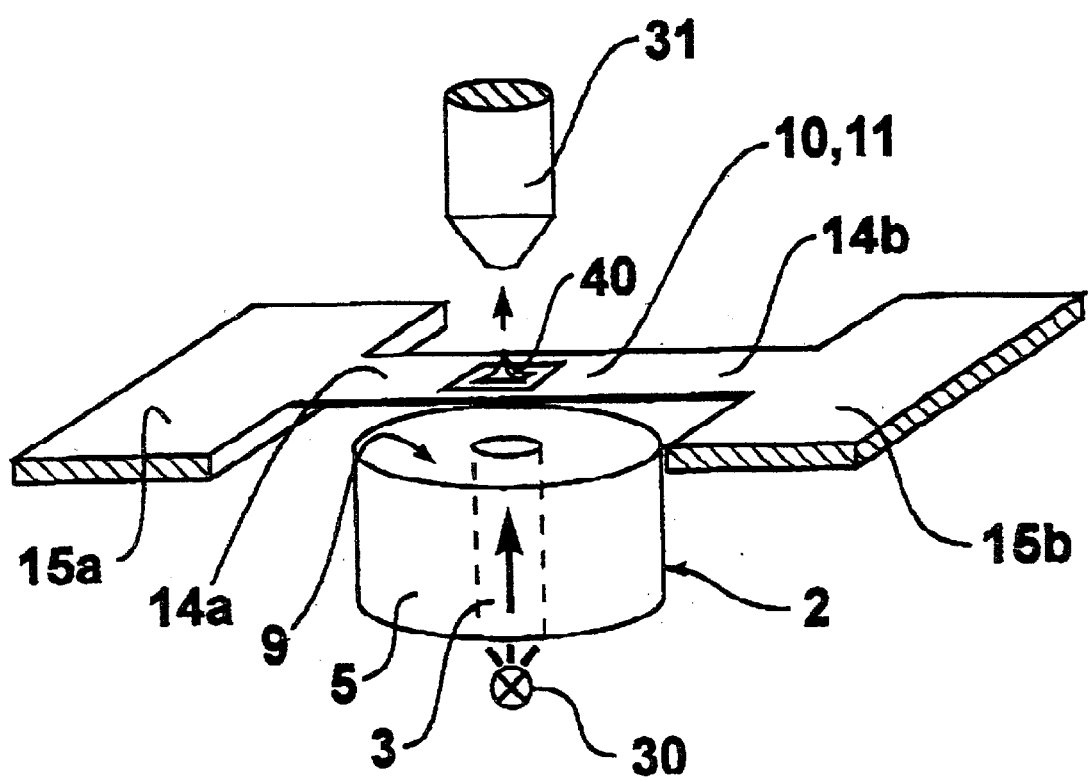
FIG. 7 shows the positioning of the tip using an optical device.

Depicted in FIG. 7 is the positioning of the tip 40 over the core 3 of the optical waveguide 2 using an optical process. Over the light emitting surface 9 of the optical waveguide 2 a membrane 11 is arranged at a distance, the membrane having a square middle part instead of a round middle part 18, which transitions directly into the strip 14a,b, on which the side parts 15a,b are formed. On the upper side of the membrane 11, the tip 40 is attached and has a pyramid shape. On the side parts 15a,b, the membrane 11 is grasped and can be shifted in two directions in the membrane plane. Below the optical waveguide 2 an illuminating device 30 is arranged, which beams light into the core material 3 of the optical waveguide 2. From the tip 40 only a small portion of the light emitted from the light emission surface 9 is let through, and this light is evaluated by a detection device above the tip 40. Of this detection device only a microscope lens 31 is depicted in FIG. 7. If the tip is located in the prescribed position at the center above the core 3 of the optical waveguide 2, the measured intensity will be at a maximum. Thus, the positioning of the tip 40 can be performed by the intensity evaluation. After the optimal position has been reached, the adhesive is applied to the light emission surface 9 and the membrane 11 is connected to the optical waveguide 2.

Figure 10:
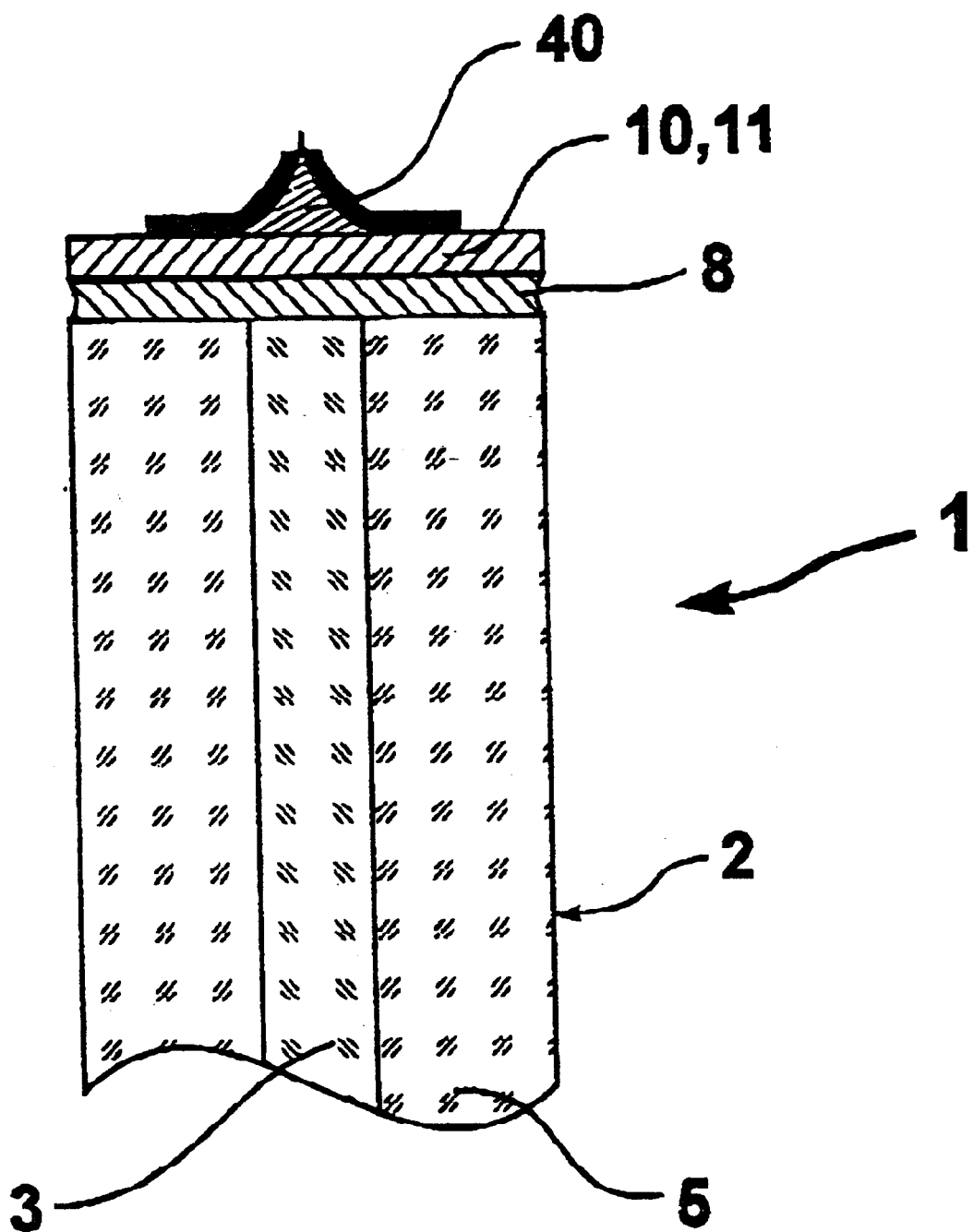

In the FIGS. 8 to 10, a further embodiment of the membrane 11 is depicted, wherein the FIG. 9 illustrates a section along the line IX—IX of the arrangement shown in FIG. 8. The middle part 18 of the membrane 11 has the same diameter as the optical waveguide 2, where between the middle part 18 and the strips 14a,b, break-off positions 13 are provided. After attaching the middle part 18 to the light emission surface 9 of the optical waveguide 2 using an adhesive layer 8, the strip 14a with the side part 15a and the strip 14b with the side part 15b are separated at the break-off positions 13. The elements 19a,b function in this embodiment not for positioning but instead only to improve handling. The finished near-field probe 1 is seen in FIG. 10.

Figure 11:
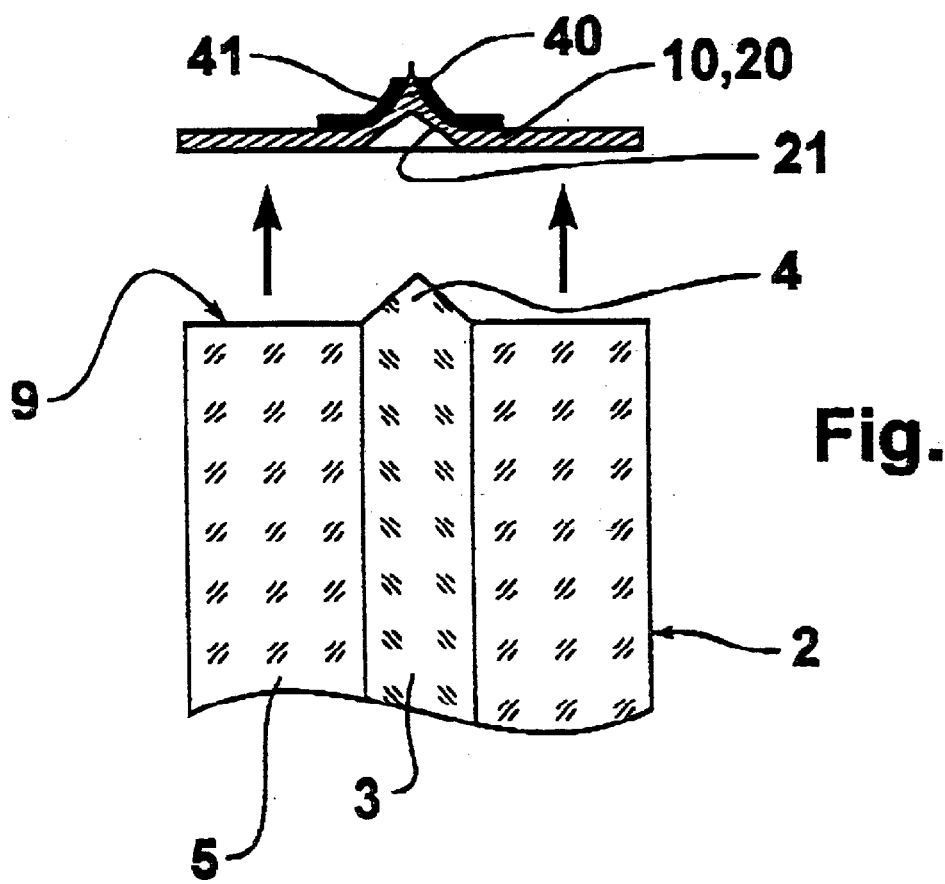
FIGS. 11 to 17 show near field probes with different locating structures.
Figure 12:
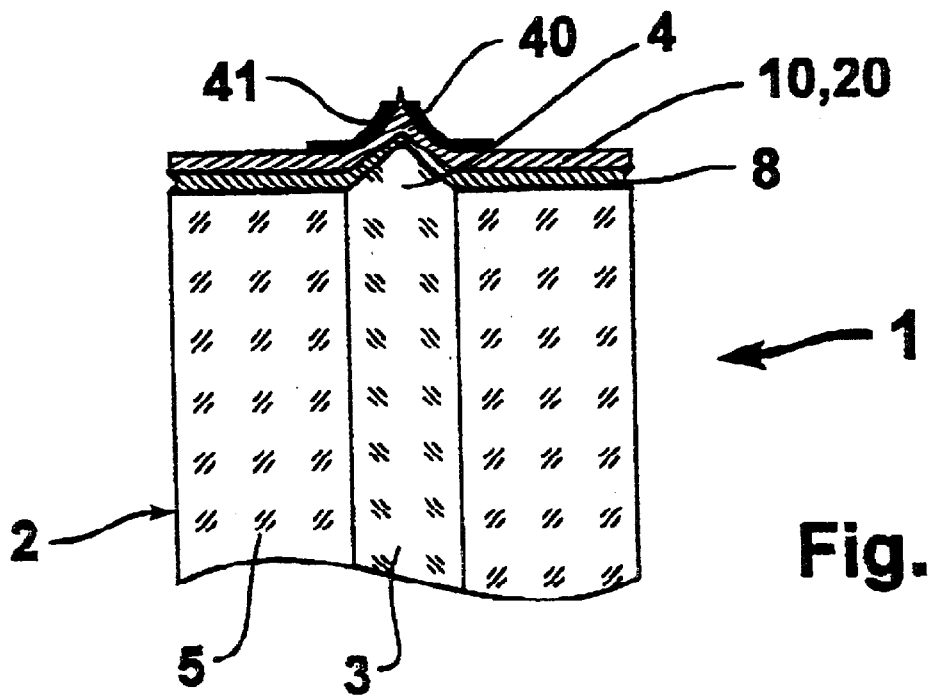

In FIGS. 11 and 12 an embodiment with locating elements is depicted. The carrier component 10 consists of a membrane 20, which is an integral component of the tip 40. In the center of the membrane 20 a cone-shaped recess 21 is formed, which extends to the inside of the tip 40. A corresponding counterpiece in the form of a core tip 4 is constructed on the emission surface 9 of the optical waveguide 2. The core tip 4 is preferably manufactured by etching. As can be seen in FIG. 12, the cone angle of the recess 21 is somewhat larger than the cone angle of the core tip 4, so that the centering of the membrane 20 on the optical waveguide 2 is made easier.

Figure 13:
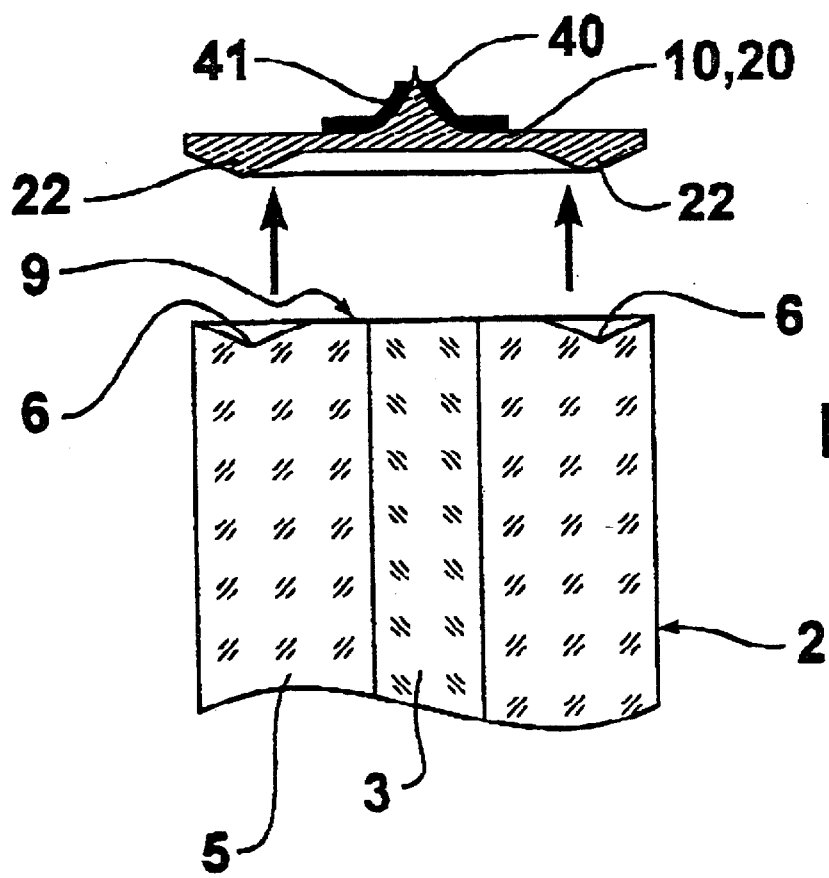
Figure 14:
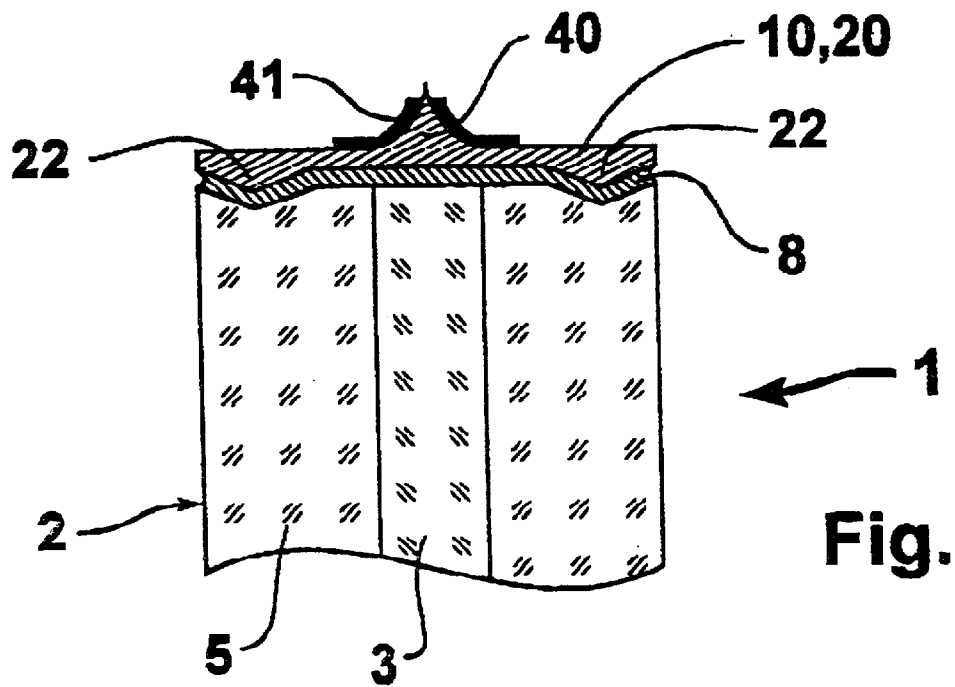

In FIGS. 13 and 14 a further embodiment is depicted, wherein the membrane 20 is likewise an integral component of the tip 40. On the underside of the membrane 20 in the edge region a ring-shaped projection 22 having a triangular cross-section is provided, which engages in a corresponding ring-shaped recess 6 in the area of the sheathing material 5 of the optical waveguide 2. The adhered membrane 20 can be seen in FIG. 14.

Figure 15:
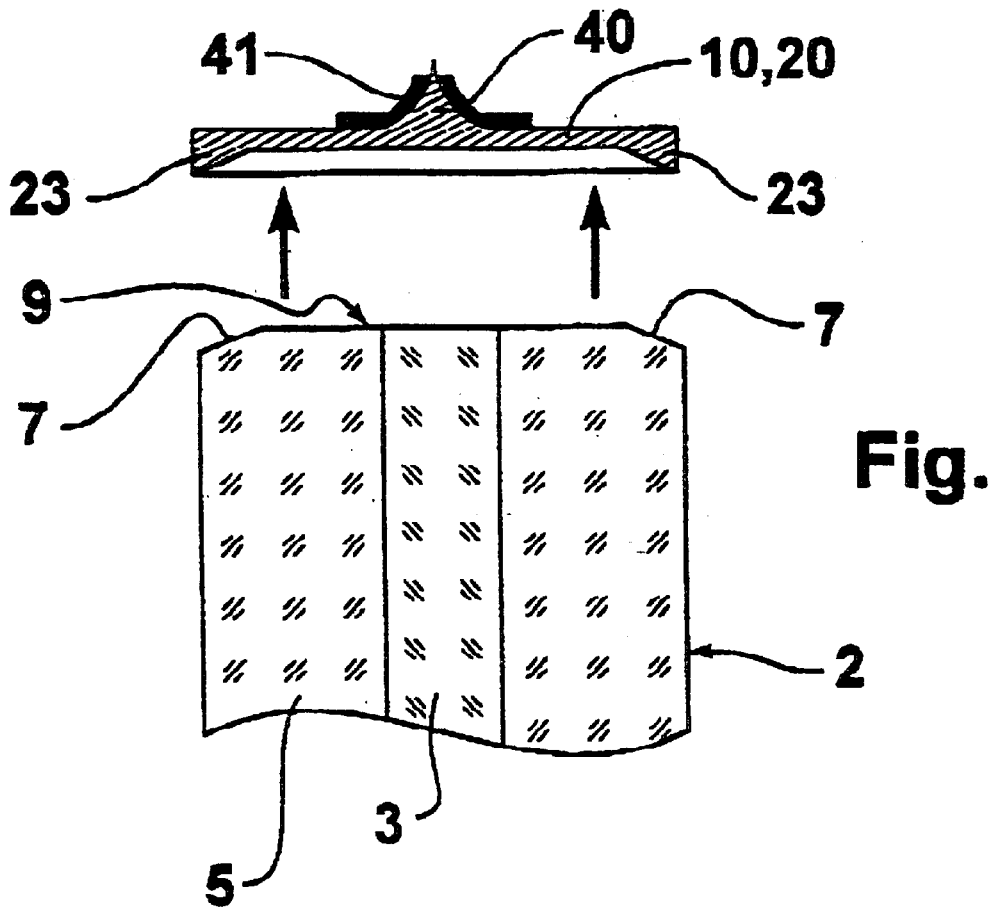
Figure 16:
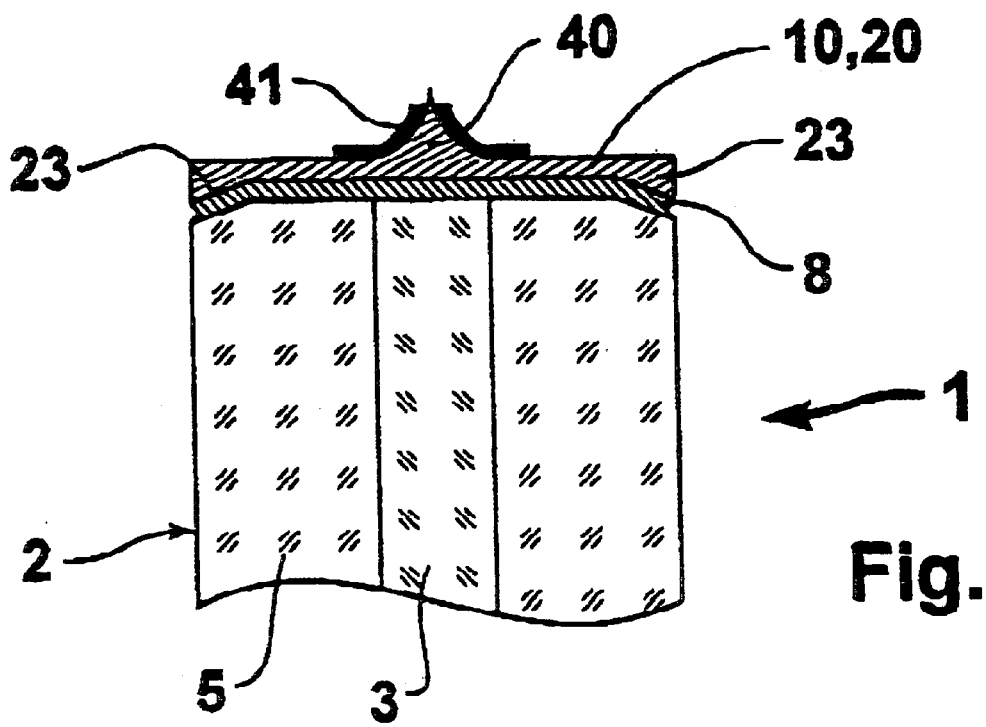

In FIG. 15 a membrane 20 can be seen, likewise as an integral component of the tip 40, which has a ring-shaped projection 23 in the outer edge area, which acts together with the chamfered surface 7 of the optical waveguide 2. This chamfered surface 7 is manufactured by polishing. The finished near-field tip 1 can be seen in FIG. 16.

Figure 17:
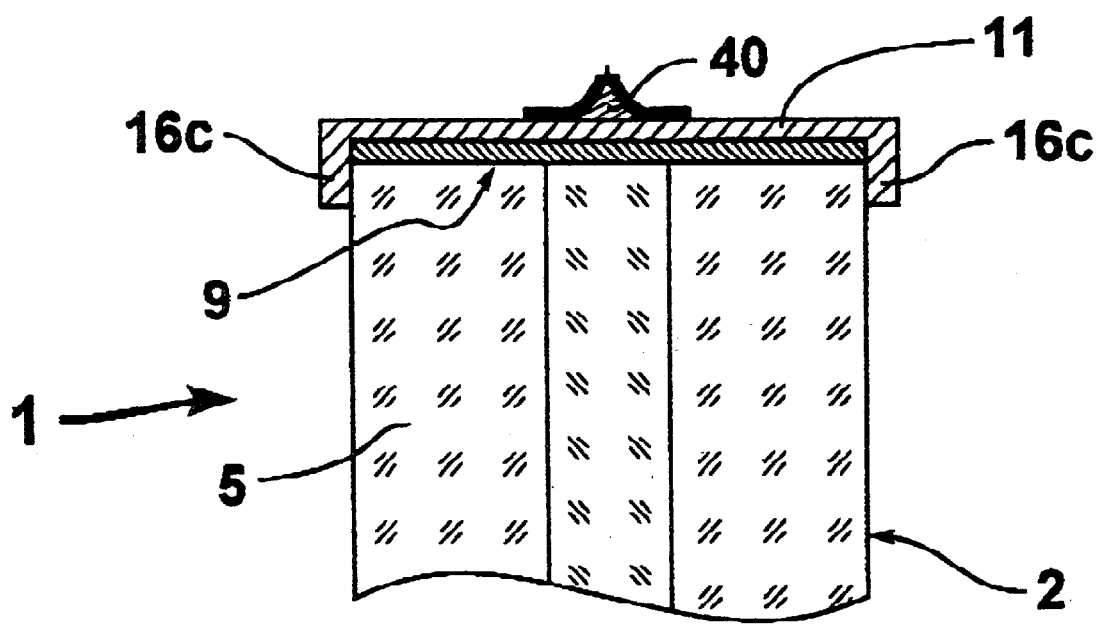

In FIG. 17 a near-field probe 1 is depicted in which the membrane 11 projects out in partial areas in relation to the light emitting surface 9 and has curve-shaped locating elements 16c on the underside, which partially encompass the outer side of the sheathing material 5.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical near-field probe, comprising an optical waveguide and a micro-engineered tip attached to a carrier component, the optical waveguide (2) comprising a rigid material, the carrier component (10) comprising a single membrane (11, 20) which is transparent at least in an area of the tip (40), the membrane being mounted on a light emission surface (9) of the optical waveguide (2), wherein dimensions of the membrane (11, 20), at least in one direction in a membrane plane, are no greater than a diameter of the optical waveguide (2).

2. The near-field probe according to claim 1, wherein the membrane (11, 20) comprises of at least one layer (50).

3. The near-field probe according to claim 2, wherein the layer (50) has a transparent inner material (52) arranged centrally in the layer and surrounded by an outer material (51).

4. The near-field probe according to claim 3, wherein the inner material (52) and the outer material (51) comprise a core material and a sheathing material corresponding to the optical waveguide (2).

5. The near-field probe according to claim 3, wherein the outer material (51) is not transparent.

6. The near-field probe according to claim 3, wherein the inner material (52) is an integral component of the tip (40).

7. The near-field probe according to claim 1, wherein the entire membrane (20) is an integral component of the tip (40).

8. The near-field probe according to claim 1, wherein at least one of the membrane (11, 20) and the optical waveguide (2) has locating elements (4, 6, 7, 16a,b,c, 21, 22, 23) for positioning the tip (40) on the optical waveguide (2).

9. The near-field probe according to claim 8, wherein the membrane (11, 20) has, on a side facing away from the tip (40), at least one recess (21) and/or at least one projection (22, 23) which acts together with a corresponding locating element (6, 7) of the optical waveguide (2).

10. The near-field probe according to claim 9, wherein the recess (21) extends into an inside of the tip (40).

11. The near-field probe according to claim 1, wherein the membrane (11, 20) is connected to the light emission surface (9) of the optical waveguide (2) by a transparent adhesive layer (8).

12. The near-field probe according to claim 11, wherein the adhesive is a pressure adhesive.

13. The near-field probe according to claim 1, wherein the optical waveguide (2) is a glass fiber or a polymer fiber.

14. An optical near-field probe, comprising a micro-engineered tip (40), a carrier component (10) comprising a single membrane (11,20), the single membrane supporting the micro-engineered tip and being transparent at least in an area of the micro-engineered tip, an optical waveguide (2) attached to the single membrane, opposite from the micro-engineered tip, and formed of a rigid material, the single membrane being mounted on a light emission surface (9) of the optical waveguide (2), wherein dimensions of the single membrane (11,20), at least in one direction in a membrane plane, are no greater than a diameter of the optical waveguide (2).

* * * * *